F. EGGE & F. W. SMITH.
LOCKS FOR DRAWERS, &c.
No. 190,297. Patented May 1, 1877.
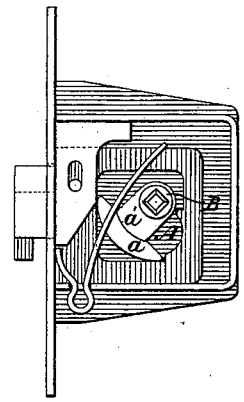
Fig. 4.
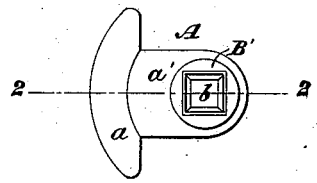
Fig. 5
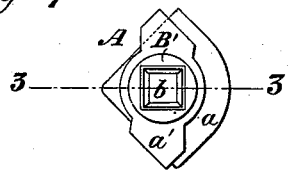
Fig. 7
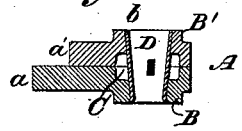
Fig. 6.
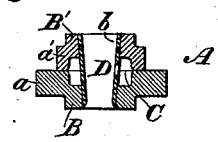
Fig. 8
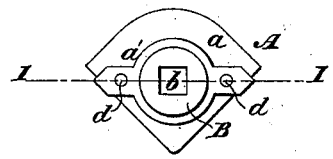
Fig. 3
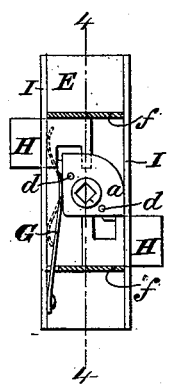
Fig. 1.
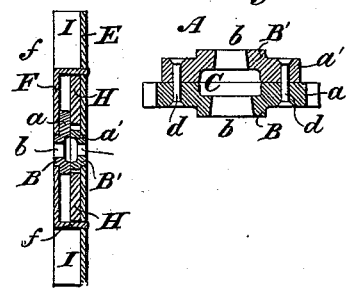
Fig. 1ᵃ  Fig. 2.
WITNESSES
Wm A. Skinkle
F. Smith
INVENTORS
Fredrick Egge
Friend W. Smith
By their Attorneys.
Baldwin, Hopkins & Peyton.

UNITED STATES PATENT OFFICE.

FREDRICK EGGE AND FRIEND W. SMITH, OF BRIDGEPORT, CONNECTICUT.

IMPROVEMENT IN LOCKS FOR DRAWERS, &c.

Specification forming part of Letters Patent No. 190,297, dated May 1, 1877; application filed March 28, 1877.

*To all whom it may concern:*

Be it known that we, FREDRICK EGGE and FRIEND W. SMITH, both of Bridgeport, in the county of Fairfield and State of Connecticut, have invented certain new and useful Improvements in Locks, of which the following is a specification:

Our invention, while more especially relating to a sewing-machine drawer-lock, relates generally to locks of the class which have pivoted, turning, or oscillating cams or hubs, engaged and operated directly by keys, and acting upon the bolts to shoot or retract them.

The object of our invention mainly is to improve such hubs or cams, to which end our improvement consists in forming the hub of sheet metal in sections by stamping and uniting the parts, as will hereinafter more specifically be designated.

Our object, further, is to provide a simple effective drawer-lock for sewing-machines, to which end our improvement consists in a novel construction and combination of parts, hereinafter specifically set forth.

The accompanying drawings show several hubs or cams, all constructed in accordance with our invention, but differing somewhat in form or outline to adapt them to the different locks to which they are suited, and two such locks with the cams in place.

Figure 1 is a view of a drawer-lock, with its casing partly in section; Fig. 1ª, a section through the same on the line 4 4 of Fig. 1. Figs. 2 and 3 are views, on an enlarged scale, of the hub, (shown in Fig. 1,) Fig. 2 being in section on the line 1 1 of Fig. 3. Fig. 4 is a view of a cover or lid-lock, with a portion of the casing removed. Figs. 5 and 6 are views, on an enlarged scale, of the hub, (shown in Fig. 4,) Fig. 6 being in section on the line 2 2 of Fig. 5. Figs. 7 and 8 are views of a hub or cam of a form somewhat differing from the others, the latter figure being in section on the line 3 3 of the former.

Each hub or cam A is composed of two main parts or sections, $a$ $a'$, stamped out of sheet metal and secured together by riveting.

Each of these sections is made at a single operation, the hollow trunnion or pivotal support B B' being formed by displacing, at a single blow of the punch, the metal at and around the opening $b$ for the key. The depressions made upon those sides or faces of the sections which become their inner or contiguous surfaces when the sections are united, form central chambers or hollows C in the hub. Thus not only is the hub made of less metal, and much lighter than when cast or made of a single piece of metal, but provision is made for the insertion and retention of a spring or yielding bushing around the key-hole or opening in the hub, which, by creating friction upon the key-stem or portion which enters the tubular hub, effectually prevents the jolting out or accidental dropping of the key from the lock.

The section $a$ and $a'$ are secured together by rivets $d$ $d$, (see Figs. 1, 2, and 3,) or by heading or striking up the tubular lining or sleeve D for the hub or key-hole. By tapering this sleeve, as shown in Figs. 6 and 8, but one end (the small end) of it need be clinched or struck up. When the sleeve is used to rivet the parts together the rivet-bolts $d$ $d$ may be dispensed with, or both the tubular and the bolt riveting may be adopted for additional security.

An opening in the hub-shell or lining-sleeve D may be made, as shown in Figs. 6 and 8, to allow the spring or yielding key-hole bushing to bear against the key when in place.

The hub or cam is rocked upon its trunnions, which are supported in the lock-case by means of a key having a square stem or end to operate the bolt or bolts of the lock, according to whether a single or double bolt-lock is employed.

Fig. 1ª shows a drawer-lock case of peculiar construction. It has a trough-like back, E, and a cap or covering plate, F, the ends $f$ $f$ of which are bent at right angles to its main portion, and pass through slots in the back, to which they are secured by heading or striking up. A very simple and inexpensive case is thus produced, no screws or rivets being employed; and the interior of the lock is protected from sawdust, chips, &c. A spring, G, bearing at its outer end upon the hub, holds the bolts H H, which work through slots in the sides I I of the back, either in their shot or retracted position, and prevents them from being accidentally retracted by the jarring, shaking, or tilting of the machine to which the locks are applied.

We have shown and described the hub or cam as made up of two main parts or sections; but, obviously, it may be made of a greater number of sections—for instance, if it be desired to increase the size of the center chamber, an additional piece or section may be used and placed between the parts $a$ $a'$, and the whole united by riveting, or by other equivalent means, such as screws, brazing, &c. Instead of the spring G secured at one the end, and bearing at its opposite end upon hub, a loose plate-spring, such as represented by dotted lines, Fig. 1, may be used, and bear at its center upon the hub.

We claim as our invention—

1. The stamped lock hub or cam, constructed of separately-made and rigidly-united sections, with the hollow trunnions B B', formed by the metal displaced at and around the opening for the key, as set forth.

2. A sectional lock hub or cam composed of two or more main parts stamped out of sheet metal, recessed upon their inner sides or contiguous surfaces to form a central chamber, and secured together by riveting or otherwise, as set forth.

3. The combination of the trough-like lock-back, the cap or covering plate, having ends which project through, and are headed against the lock-back, and the cam or hub mounted in said back and plate and operating upon the bolts, substantially as hereinbefore set forth.

In testimony whereof we have hereunto subscribed our names.

FREDRICK EGGE.
FRIEND W. SMITH.

Witnesses:
O. C. SMITH,
FRED. E. SILLIMAN.